May 7, 1968     D. P. DIXON     3,381,492
AUTOMOBILE AIR CONDITIONING SYSTEM
Filed Sept. 16, 1966     4 Sheets-Sheet 1
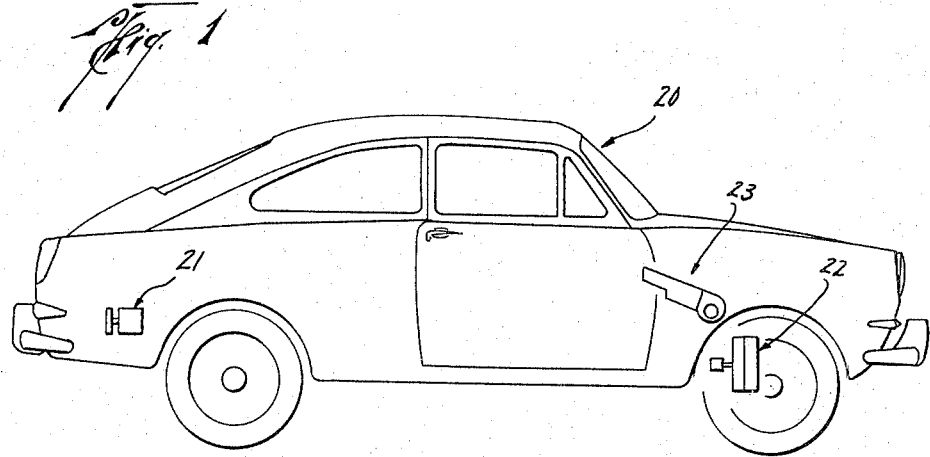
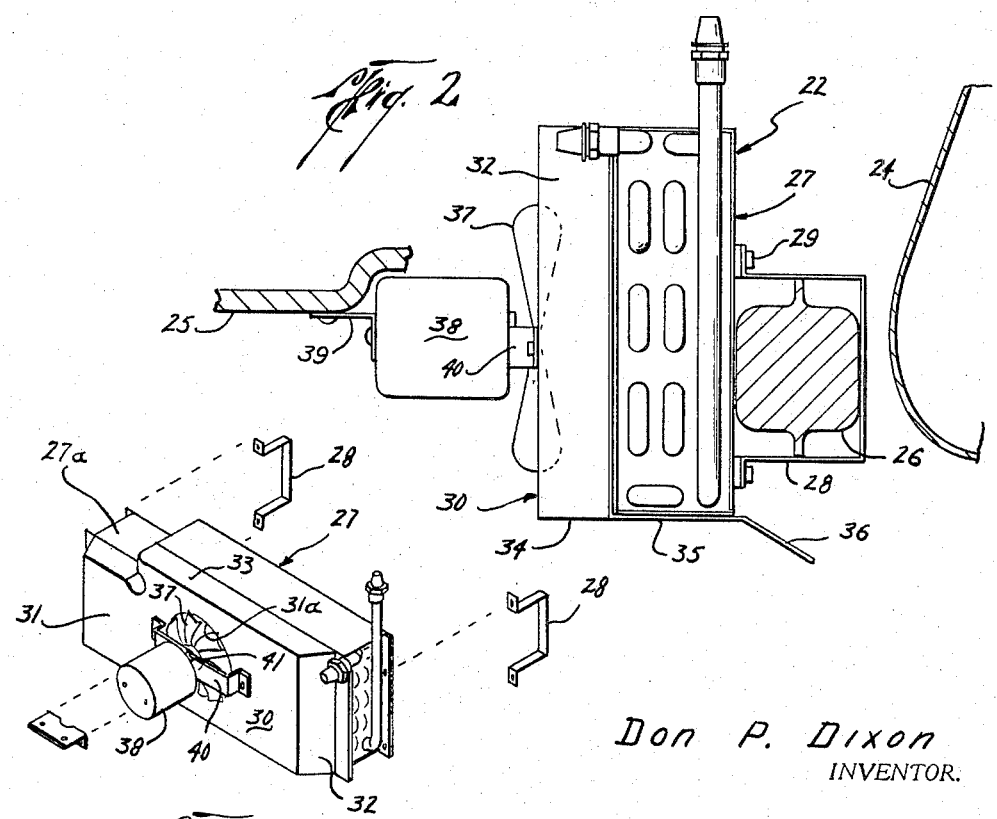
Don P. Dixon
INVENTOR.
BY Browning, Simon, Hyer & Eickenroht
ATTORNEYS May 7, 1968  D. P. DIXON  3,381,492
AUTOMOBILE AIR CONDITIONING SYSTEM
Filed Sept. 16, 1966  4 Sheets-Sheet 2

Don P. Dixon
INVENTOR.

BY Browning, Simms, Hyer
& Eickenroht
ATTORNEYS

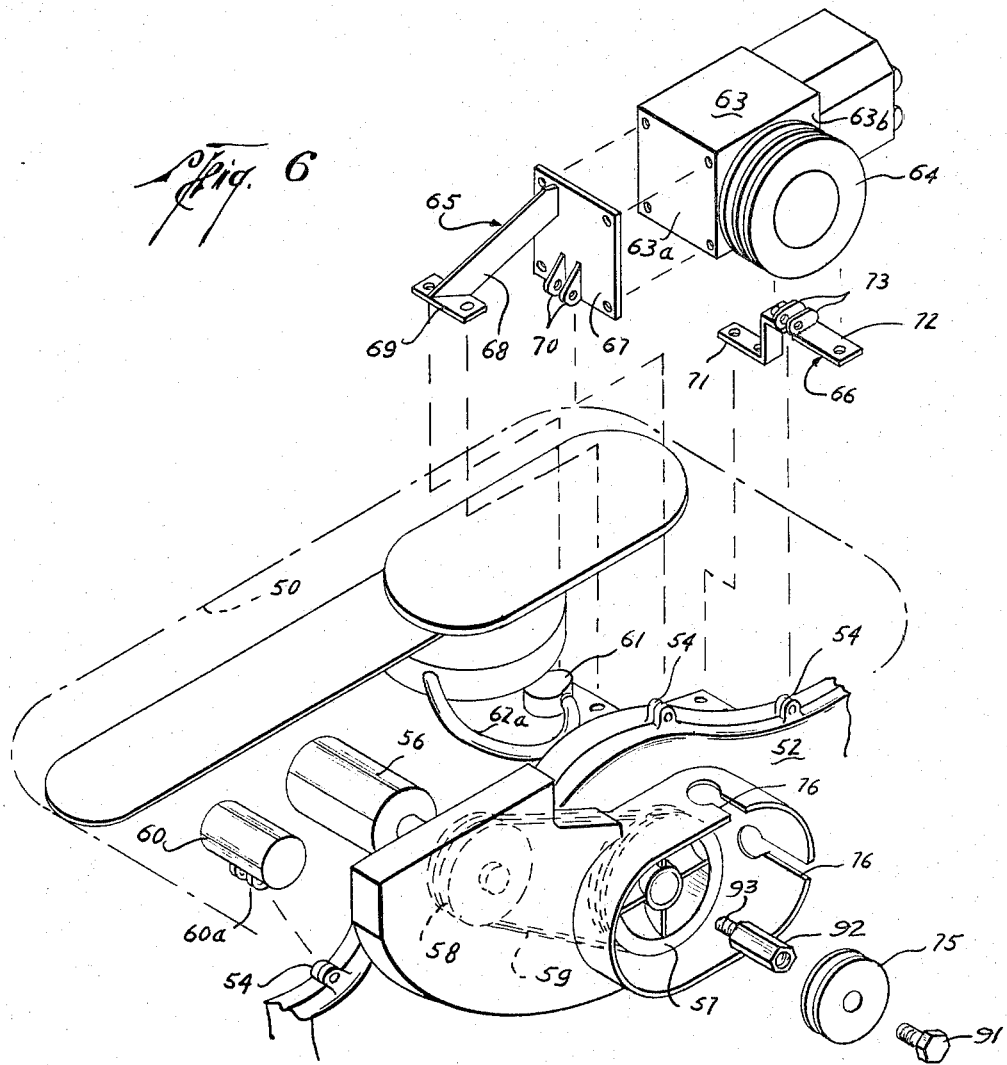

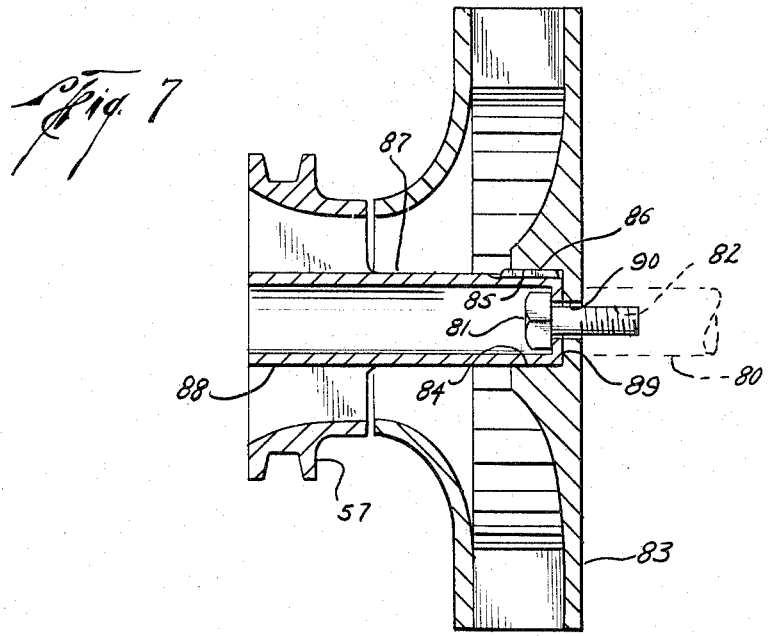
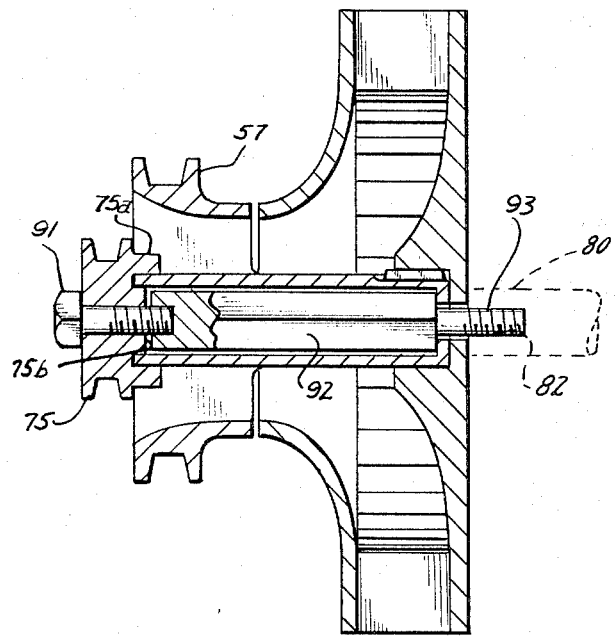
Don P. Dixon
INVENTOR.

United States Patent Office 3,381,492
Patented May 7, 1968

3,381,492
AUTOMOBILE AIR CONDITIONING SYSTEM
Don P. Dixon, 504 E. Josephine,
San Antonio, Tex. 78215
Filed Sept. 16, 1966, Ser. No. 580,106
6 Claims. (Cl. 62—244)

ABSTRACT OF THE DISCLOSURE

An air conditioning system for a "1600" series or "fast back" or "square back" Volkswagen automobile including a compressor mounted on the head and fan housing of the motor in a rear compartment of the automobile and on the right side of the crankshaft. In order to accommodate the compressor, the existing coil for the motor is moved from a position mounted on the right side of the fan housing to a position mounted on the left side thereof, and the inlet to the existing air cleaner is turned to face forwardly and to the right of the automobile with its hose extending from the inlet into the right corner of the compartment and then rearwardly between the compressor and the right side of such compartment. The system also includes a condenser assembly mounted between the front axle and the undercarriage of the automobile rearwardly of such axle.

---

This invention relates to an air conditioning system for an automobile; and, more particularly, an improved system which is especially well suited for the "1600" series or "fast back" or "square back" Volkswagen automobile.

Conventional air conditioning systems are not suited to the compact construction of the Volkswagen automobile. That is, there is a very basic problem in finding room for the components of the system, at least without a major modification of the construction of the Volkswagen and/or the use of specially designed parts. This is particularly true of the compressor for the system which, as a practical matter, must be located adjacent the power take-off on the crankshaft of the rear mounted motor of the automobile, where space is especially critical.

Because of the space problem, as well as a desire to avoid overheating the engine of this type of automobile, it has been proposed to locate the condenser assembly at the front end of the automobile, and particularly adjacent the undercarriage in a position to receive outside air. The design and installation of the assembly in this general area is nevertheless a problem, because of both the limited space and its inaccessibility.

An object of this invention is to provide the "1600" series or "fast back" or "square back" Volkswagen with an air conditioning system which is compact, employs standard parts, and requires no major reconstruction of the automobile.

A more particular object is to arrange the compressor and motor parts within the rear compartment of this type of automobile in such a manner as to keep them within the normal confines of the compartment and, at the same time, enable them to be so arranged with a minimum of time and expense.

A still more particular object is to provide a mounting for the compressor in the motor compartment which takes maximum advantage of existing parts on the motor.

Another object is to provide a simple and compact arrangement for connecting the compressor to the power take-off of the crankshaft of an automobile of this type.

A further object is to mount the condenser assembly in such a manner as to avoid any modification of the existing parts of the automobile, other than the attachment thereto of a few brackets, and to simplify its installation and repair.

A still further object is to provide a condenser assembly which is of compact and inexpensive construction and which is especially well adapted for the foregoing objects.

The invention will now be described in detail in connection with the attached drawings, in which:

FIGURE 1 is a side view of a "1600" series or "fast back" Volkswagen automobile, with components of the air conditioning system shown superimposed thereon;

FIGURE 2 is an end view of the condenser assembly, as seen along a vertical section taken longitudinally of the automobile;

FIGURE 3 is an exploded view, in perspective, of the parts of the condenser assembly;

FIGURE 6 is a perspective view of the motor and compressor, as seen in FIGURE 5, and with the compressor and its mounting parts raised from above the motor and shown in exploded fashion for purposes of illustration;

Figure 4:
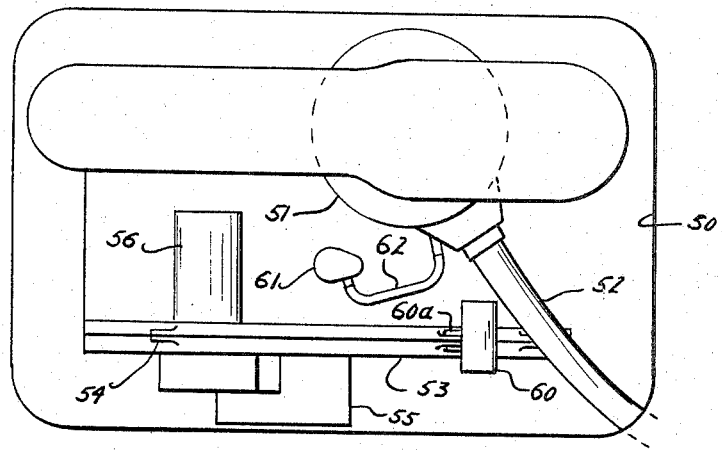
FIGURE 4 is a plan view of the motor within the rear compartment of the automobile prior to installation of the compressor of the air conditioning system of the present invention.

FIGURE 7 is an enlarged vertical sectional view of a fan and pulley mounted on the end of the crankshaft, which is shown in broken lines, prior to the installation of the air conditioning system; and FIGURE 8 is a view similar to FIGURE 7, but upon installation of the air conditioning system including a second pulley on the end of the crankshaft to receive a belt connecting with the clutch pulley of the compressor.

With reference now to the above-described drawings, and particularly FIGURE 1, the "1600" series of Volkswagen shown therein, and designated in its entirety by reference character 20, has its motor mounted in a compartment at the rear and accessible by means of a door leading to a storage compartment above the motor compartment. The storage and motor compartments are separated by a horizontal wall having a removable panel. A compressor 21 for the air conditioning system is shown in FIGURE 1 in approximately the position it occupies within such motor compartment.

As indicated in FIGURE 1, a condenser assembly 22 is mounted in a space in the forward portion of the automobile 20 intermediate the axle for the front wheels and a portion of the undercarriage to the rear of the front axle. The system also includes evaporator 23, which is mounted beneath the dashboard in the interior of the automobile. However, the construction and arrangement of the evaporator within the automobile does not form a part of the present invention.

As well known in the art, these as well as other components of the air conditioning system are connected to one another for circulating a refrigerant therethrough and thereby cooling the interior of the automobile. Power is, of course, transmitted from the drive shaft of the motor to the compressor 21, all in a manner to be described hereinafter.

The condenser assembly 22 is shown in FIGURE 2 to be disposed between a compartment 24 on the forward end of the automobile 20 for storing a spare tire and a portion of the undercarriage 25 rearwardly of compartment 24. More particularly, the condenser assembly 22 is mounted from and between the front axle 26 of the automobile and the undercarriage 25 by means of brackets to be described below.

As shown in FIGURES 2 and 3, the assembly 22 includes a coil 27 made up of the usual tubes and fins and adapted to extend laterally of the automobile and parallel to the axle 26 so that outside air may pass over the laterally extending tubes through which the refrigerant is passed. This coil is generally rectangular in shape, except for a notch 27a in one corner to accommodate the steering box, while using the available end to end clearance in this portion of the automobile. In other respects, this coil may be of standard construction readily available from commercial sources. It is assembled by being moved upwardly into the space between the axle 26 and undercarriage 25. Two or more U-shaped brackets 28 are then moved over the axle and attached to the front side of the coil 27 by means of bolts 29, which thereby suspend the coil 27 and hold its front side firmly against the back side of the axle 26. More particularly, the brackets are so attached to the coil 27 as to dispose its lower end beneath the bottom of the axle 26 in position to receive air during forward movement of the automobile both beneath as well as above the axle.

A shroud 20 is mounted on the coil 27 so as to enclose a space across its backside. More particularly, the shroud includes a rear wall 31 spaced behind the rear side of coil 27 and having an opening 31a disposed centrally therein. It also includes side walls 32 having flanges attachable in any suitable manner to oppositely facing flanges on the rear side of the coil 27, and a top and bottom wall 33 and 34, respectively, forming continuations of the top and bottom of the coil 27. As best shown in FIGURE 2, the bottom wall 34 has a forward extension 35 which is bent downwardly to form a scoop 36 on its forward end for directing air flow beneath the axle 26 toward the front side of the coil 27. This scoop 36 preferably extends for the full width of the coil and shroud.

As will be appreciated from FIGURES 2 and 3, the shroud is moved into position for attachment to the coil 27 merely upon an upward and forward movement so as to locate the flanges on its side walls 32 opposite the flanges on the rear side of coil 27 and to the extension 35 of its rear wall against the bottom side of coil 27. At this time, the flanges on the shroud and coil may be attached to one another, as a result of which the scoop 36 is automatically positioned and the space between the rear wall 31 of the shroud and the rear side of the coil 27 is enclosed.

A fan 37 is located within the opening 31a in rear wall 30 of the shroud for drawing the air through the coil 27 and out the back of the shroud. As indicated in FIGURE 3, the ends of the blades of the fan 37 fit rather closely within the opening. The fan is driven by means of a motor 38 which is attached both to the undercarriage 25 and to the shroud 30 for suspending the fan in proper position within the shroud opening.

For the above purposes, there is an angle bracket 39 having a lower leg attachable to the rear side of the motor 38 and a horizontal leg for attachment to the bottom side of undercarriage 25. There is also a generally U-shaped bracket 40 having its opposite ends attachable to the rear wall 31 of the shroud and its intermediate portions attachable to the front side of the motor 38. The bracket is recessed along this intermediate to accommodate the shaft 41 of the motor. The fan and motor may be moved upwardly into position between the shroud and undercarriage and then attached thereto in an obvious manner.

Figure 5:
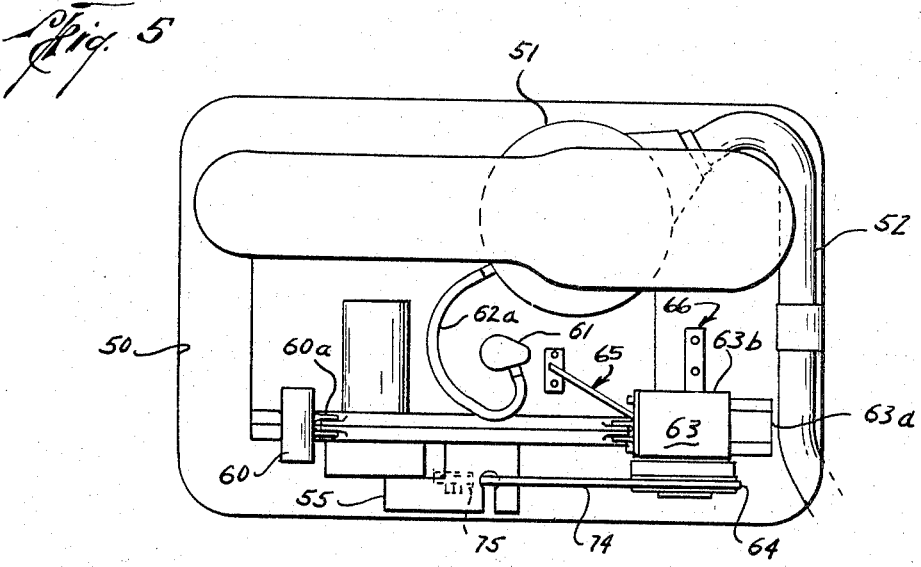
FIGURE 5 is a similar plan view of the motor, but with the compressor of the air conditioning system installed and some of the parts of the motor rearranged to accommodate it.

The generally rectangular outline 50 shown in FIGURES 4 and 5 indicates the opening for the panel leading to the motor compartment, as well as the general outer confines of such compartment. The panel lies closely over the top of such motor parts. As shown in FIGURE 4, in the compartment prior to installation of the air conditioning system of the present invention, an air cleaner 51 mounted on the head has a hose 52 connecting with an inlet thereto for air from the outside. More particularly, the hose connects with the inlet on the rear side of the cleaner toward the right side of the compartment. Thus, the hose 52 extends generally rearwardly and to the right into the right rear corner of the compartment.

Also, a fan housing 53 extends laterally across the head of the motor rearwardly of the air cleaner 51. As best shown in FIGURE 6, the fan housing 53 includes laterally split housing parts connected by bolts extending through matching holes in bosses 54 on the respective parts of the housing. The housing has a rearwardly extending shroud 55 adapted to surround a pulley 57 on the forward end of the crankshaft for receiving a belt 59 extending about another pulley 58 for driving a generator 56 mounted above the head to the left of the crankshaft.

The other portions of the motor which are pertinent to the present invention comprise an electrical coil 60 mounted above the fan housing 53 by bolts extending through ears 60a on the coil and one set of bosses 54 on the adjacent portions on the top of the fan housing. Thus, as can be seen from this figure, the ears 60a straddle the bosses so as to be moved into alignment with the holes in the fan housing ears. A still further pertinent portion of the motor is a crankcase ventilator 61 connected to the air cleaner by means of a hose 62.

As will be appreciated by those skilled in the art, the location of the air cleaner 52, the ventilator 61, and the fan housing 53 and its shroud 55 are fixed due to their connection to the head of the motor. On the other hand, the air cleaner 52 may be rotated and the coil 60 as well as the hose 52 leading to the inlet to the air cleaner 51 may be moved, within limits, without interfering with the operation of the motor.

This invention takes advantage of these characteristics by so moving these latter parts and rearranging them in positions which enable the compressor 21 of the air conditioning system to be mounted above the right rear portion of the motor and in position to take power from the crankshaft. More particularly, and as best shown in FIGURES 5 and 6, the coil 60 is moved to a position on the left hand side of the fan housing 53, and mounted on the ears 54 on the left hand side of the fan housing in substantially the same way it was mounted prior to installation of this air conditioning system.

The air cleaner 51 is rotated to the position shown in FIGURE 5 in which its inlet connecting with the hose 52 extends in a direction toward the front right corner of the compartment for the motor. The rearranged hose thus extends to the right forward corner of the motor compartment, where it is bent back to extend rearwardly along the right side of the compartment. Also, the connection for the hose 62 leading from the air cleaner to the ventilator 61 is rotated to dispose it substantially diametrically opposite to the rearranged inlet to air cleaner 51. This enables the ventilator 61 to be left in its permanent position and connected to the air cleaner by a slightly longer hose 62a.

Thus, as shown in FIGURES 5 and 6, the compressor 63 can be lowered onto the right hand end of fan housing 52 for mounting upon the fan housing and an adjacent portion of the head of the motor. More particularly, the compressor is mounted on its side—i.e., with its longitudinal axis extending laterally of the motor compartment—which permits it to be longer and thus of greater capacity. This positions the opposite ends 63a, opposite sides 63b, top 63c and bottom of the compressor, as indicated by the reference characters in FIGURES 4 to 6, with its clutch pulley 64 on one of its sides spaced to the right of the power take-off of the crankshaft opposite generator 56.

As best shown in FIGURE 6, a bracket 65 supports one end of the compressor above the head of the motor, and a bracket 66 supports the bottom of the compressor above both the head and fan housing 52. Thus, the bracket 65 includes a plate 67 attachable by bolts to the end 63a of the compressor 63. A leg 68 extends from the outer face of plate 67 and has a flange 69 on its outer end with holes therethrough for connecting it to tapped holes in the top of the head, as indicated in FIGURE 6. These latter holes exist in the head, prior to installation of this system, to receive studs for securing a cover plate on the head. The flange 69 therefore goes between the studs and cover plate. There are also a pair of ears 70 on the lower edge of the plate 67 having aligned holes therethrough adapted to pass over the ears 54 on fan housing 52 to which the coil 60 was formerly connected, as shown in FIGURE 4. At this time, a bolt may be passed through the aligned holes in the two sets of ears for attaching the plate to the fan housing. As shown in FIGURE 5, the leg 68 extends not only downwardly, but also at an acute angle with respect to the longitudinal axis of the compressor 63 so as to dispose its flange 69 in position to bolting to the top of the head between air cleaner 51 and fan housing 53.

The bracket 66 includes a strap having a first portion 71 with a hole therein for a stud received in tapped hole in the head for securing a sheet metal shroud over a portion of the motor head. As indicated in FIGURES 5 and 6, these holes are formed of the right end of the fan housing. A second portion 72 of the bracket 66 connects with portion 71 by a bend and has bolt holes for connecting it to the bottom side of the compressor 63, as also indicated in FIGURE 6.

There are a pair of spaced ears 73 on opposite sides of a recess on the left side of portion 72 facing the crankshaft. This permits bolt holes in the spaced ears to be moved into alignment with bolt holes in the bosses 54 on the fan housing to the right of the bosses to which ears 70 connect. These bosses on the fan housing were formerly disposed beneath the hose 52.

As shown in FIGURE 5, a belt 74 connects the pulley 64 in the compressor with a pulley 75 connected to the end of the crankshaft, in a manner to be described. For this purpose, shroud 55 is slotted at two places, as indicated by reference 76 to pass the upper and lower runs of the belt 74. Tension in the belt may be adjusted by the use of shims placed between the end 63a of the compressor 63 and the inner face of plate 67 of bracket 65.

As best shown in FIG. 7, prior to installation of the air conditioning system in an automobile of this type, the pulley 57 adapted to receive the belt 59 (see FIGURE 6) is connected to the crankshaft 80 for rotation therewith by means of a bolt 81 having its threaded end made up within a tapped hole 82 in the end of the crankshaft. More particularly, a fan 83 is connected to the pulley 57 for rotation therewith by means of a recessed portion 84 therein having a slot 85 to receive a key 86 on a hollow axial extension 87 of the shaft 88 of the pulley 57.

More particularly, the axial extension 87 fits closely within the recessed portion 84 of the fan hub and has an inwardly turned flange 89 at its end which is held in abutment with the inner wall of the recessed portion 84 of the hub surrounding hole 90 through the rear wall of the fan 83. As can also be seen from FIGURE 7, in the inner periphery of the flange 89 provides a hole aligned with the hole 90 so that the bolt 81 may be passed through both of them for threadedly engaging the tapped opening 82 in the crankshaft. The enlarged head 81 on the bolt thus engages the inner side of the flange as the bolt is made up with the opening 82 so as to tightly compress the flange and inner wall of the fan 83 between it and the end of the crankshaft 80 surrounding the tapped opening 82.

As can be seen from FIGURE 7, there are a plurality of blades within the fan 83 between the inner and outer walls thereof which connect with vanes through a hollow portion of the pulley 57 surrounding axle 88. The extension 87 of the axle 88 is of such length as to bring the inner side of the pulley 57 close to the adjacent side surrounding the opening in the fan 83.

As previously mentioned, and as shown in FIGURE 8, the pulley 75 is also connected to the crankshaft 80 for rotation therewith. More particularly, and in accordance with one of the novel aspects of the present invention, the pulley 75, which is adapted to receive belt 74 connecting it with the pulley 64 on the compressor 63, is connected to the crankshaft by a means which requires only a minor alteration of the existing structure of the pulley 57, fan 83, and their associated parts. Furthermore, this connection is made in such a manner as to reduce to a minimum the likelihood of failure.

Thus, as shown in FIGURE 8, the inner wall of the pulley 75 is connected by means of a bolt 91 to a square rod 92 having a threaded pin 93 on its opposite end for making up with the tapped opening 82 in the crankshaft 80. More particularly, the rod 92 is larger in cross section than the threaded pin 93, which corresponds in cross section to the threaded portion of the bolt 81. Thus, it is not only rigid for torque purposes, but also has an annular shoulder on its inner end for engaging the inner surface of the flange 89 and thus holding the flange and inner wall of the fan 83 about the hole 90 tightly between the rod 92 and the crankshaft 80.

The rod 92 is of substantially the same length as the axle 88 and its extension 87, so as to extend substantially all the way between the pin and pulley 75. In assembling, it is first moved through axle 88 and its extension 87 and its pin 93 tightly made up with crankshaft 80. Pulley 75 has an annular enlargement 75b on its inner face which fits closely within the outer end of axle 88 to align it. It also has pins 75a outwardly of enlargement 75b for fitting between adjacent vanes of pulley 57. When so fitted, pulley 75 is then connected to the outer end of pin 92 by bolt 91 which pulls the inner end of the pulley tight against the outer end of axle 88.

From the foregoing, it will be seen that this invention is one well adapted to attain all of the ends and objects hereinabove set forth, together with other advantages which are inherent to the apparatus.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a Volkswagen automobile in which the motor is mounted in a rear compartment having left and right sides when facing in a forward direction, said motor including a fan housing extending laterally of the compartment above the head of the motor, a crankshaft extending through the fan housing, a generator on left side of the crankshaft, an air cleaner mounted above the head forward of the fan housing and having a hose connecting to the inlet thereof; the improvement comprising an air conditioning system having a compressor mounted on the head and fan housing on the right side of the crankshaft, the inlet of said air cleaner facing forwardly and toward said right side of the compartment, and said hose extending from the inlet into the forward right corner of the compartment and then rearwardly between the compressor and said right side of the compartment.

2. In a Volkswagen of the character defined in in claim 1, wherein said fan housing is split into laterally extending sections having bosses with aligned bolt holes; the further improvement in which the compressor is mounted on the housing by bolts extending through at least some of the bolt holes in said bosses.

3. In a Volkswagen of the character defined in claim 2, wherein said motor includes an electrical coil, the further improvement in which the coil is mounted between the compressor and said left side of the compartment by bolts extending through other bolt holes in said bosses.

4. For use in an air conditioned Volkswagen automobile having its motor mounted in a rear compartment, a compressor having a top, a bottom, opposite ends, and opposite sides, a pulley at one side of the compressor, a first bracket comprising a plate having an inner face, means on the plate and compressor for attaching the inner face of the plate against one end of the compressor, spaced ears on the outer face of the plate adjacent the lower edge thereof and having bolt holes therein, an arm extending from the outer face of the plate adjacent the opposite edge thereof in a direction downwardly and at an acute angle with respect to the longitudinal axis of the compressor, means on the end of the arm having bolt holes therein for attaching it to a portion of the motor, and a second bracket having a first portion with means therein for attaching it to the bottom of the compressor and a second portion extending laterally from the side of the compressor opposite the pulley, when said first portion is attached, and having means for attaching it to another portion of the motor, said second portion of the second bracket also having spaced ears with bolt holes therein for attaching said second portion to still another portion of the motor.

5. In a Volkswagen automobile having a compartment forward of the front axle for storing a spare tire; the improvement comprising an air conditioning system having a condenser assembly mounted between the front axle and the undercarriage of the automobile rearwardly of such axle, said assembly including a coil mounted on the rear side of the front axle and extending laterally thereof, and a shroud providing an enclosed space on the backside of the coil and an air scoop along the lower edge of the coil beneath the front axle, an opening in the backside of the shroud, a fan mounted in the shroud opening, and a motor for the fan mounted on the undercarriage.

6. A condenser assembly for an air conditioner adapted to be mounted between the front axle and undercarriage of a Volkswagen automobile, comprising a coil, U-shaped brackets disposable about the axle and having means thereon attachable to the coil for supporting the coil from the axle along the backside thereof, a shroud, means for attaching the shroud to the coil to form an enclosed space on the backside thereof, said shroud having a bottom wall extending beneath and beyond the front side of the bottom of the coil to provide an air scoop therefor, said shroud also having a rear wall with an opening therein, a fan having a motor, means for attaching the motor to the shroud and to the undercarriage for supporting the fan within the opening in the rear wall of the shroud.

References Cited

UNITED STATES PATENTS

| | | | |
|---|---|---|---|
| 2,903,083 | 9/1959 | Kelley | 62—239 |
| 2,989,854 | 6/1961 | Gould | 62—243 |
| 3,091,943 | 6/1963 | Plegat | 62—243 |
| 3,096,938 | 7/1963 | Cole | 62—244 X |

WILLIAM J. WYE, *Primary Examiner.*